April 4, 1961     J. G. WYERS     2,978,045
PILE DRIVER

Filed Jan. 20, 1958     3 Sheets-Sheet 1

Jan Gerrit Wyers
INVENTOR.

April 4, 1961

J. G. WYERS 2,978,045

PILE DRIVER

Filed Jan. 20, 1958

Jan Gerrit Wyers
INVENTOR.

BY *Clarence A. O'Brien*
and *Harvey B. Jacobson*
Attorneys

April 4, 1961   J. G. WYERS   2,978,045
PILE DRIVER

Filed Jan. 20, 1958   3 Sheets-Sheet 3

Jan Gerrit Wyers
INVENTOR.

BY *Clarence A. O'Brien*
and *Harvey B. Jacobson*
Attorneys

United States Patent Office 2,978,045
Patented Apr. 4, 1961

2,978,045

PILE DRIVER

Jan Gerrit Wyers, Windthorst, Saskatchewan, Canada

Filed Jan. 20, 1958, Ser. No. 709,939

4 Claims. (Cl. 175—151)

This invention relates to a pile driver and more particularly to a pile driver whose principal application is in driving posts into the ground.

An object of the invention is to provide a machine which is adapted to be connected to an ordinary tractor and use the power from the tractor power take-off for the purpose of actuating a pile driver hammer. With my machine I am able to set more posts and with a minimum of effort. Ordinarily, a farmer owns or has access to a tractor. Every tractor has a power take-off providing an excellent source of power by which to operate a machine which is constructed in accordance with my invention. Inasmuch as fencing is an important function, and the driving of the posts into the ground is at best, a laborious task, my machine serves an important function.

My pile driver has a hammer release mechanism which is very smoothly operative. There is a drum upon which the hammer cable is wound, the drum riding freely on a main rotary shaft. Brackets are bolted to the main shaft on both sides of the drum on which are mounted dogs which engage lugs that are mounted on the drum. The brackets then take the drum around for one full revolution, thereby winding the cable and lifting the hammer. At the end of one revolution, the dogs fall free and release the drum lugs. The drum then rotates freely in the opposite direction as it is pulled by the weight of the hammer. The cycle then repeats itself thereby continually providing an excellent source of force for driving fence posts or other posts, poles, etc. into the ground.

A further object of the invention is to provide a practical machine for the purposes described. It is so constructed that it may be manufactured at a low unit cost and yet, it performs its intended function very satisfactorily.

Other objects and features of importance will become apparent in following the description of the illustrated form of the invention.

Figure 1:
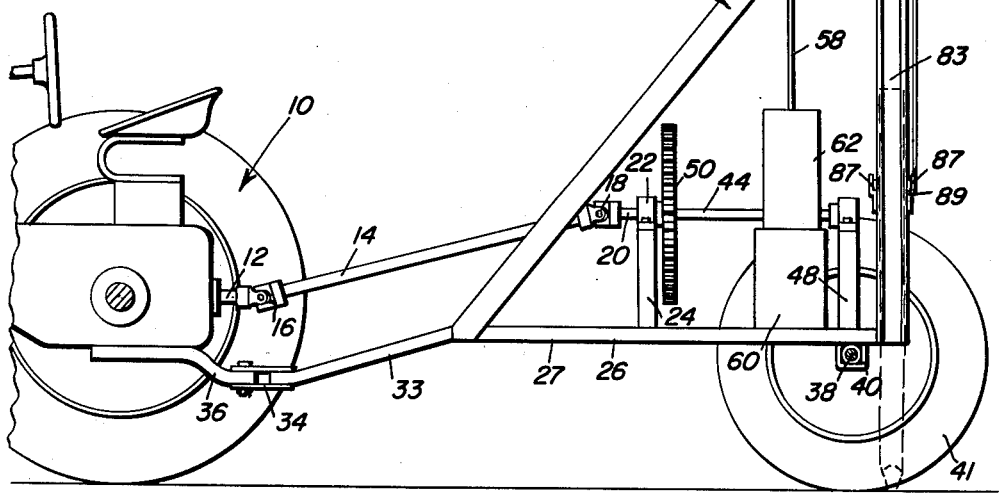
Figure 1 is a fragmentary side sectional view of a tractor and a machine constructed in accordance with the invention.

In the accompanying drawings there is shown a tractor 10 which is conventional in every way. It schematically represents any manufacturer's make of tractor which has a power take-off 12 by which drive shaft 14 is operated. The drive shaft has universal joints 16 and 18 at its ends, one universal joint connecting with the drive shaft and the other connecting with shaft 20 that is mounted in a saddle bearing 22 at the upper end of a support 24 on the frame 26 of my machine 8. Frame 26 has sides 27 and 28 joined by a plurality of transverse frame members 29, 30 and 31. Angulated and converging front frame members 32 and 33 are attached at the forward ends of sides 27 and 28 and they have a coupling 34 at their forward ends. The coupling is connected to tractor drawbar 36, this being the way that the machine 8 is drawn. Rear axle 38 is attached by hangers 40 to the frame 26, and it has wheels 41 at its ends.

Shaft 44 is mounted in bearings 45 and 46 that are disposed on support 24 and on an upright support 48 carried by a rear part of frame 26. Enmeshed gears 50 and 51 on shafts 44 and 20, respectively, establish a drive connection between the tractor power take-off 12 and a drum or pulley 54. The pulley is mounted on shaft 44 and has cable 58 entrained over it. The pulley 54 is partially submerged in an oil bath by being located in a container 60 that has oil 61 in it. A partially cylindrical guard 62 is arranged over slightly more than three-quarters of the periphery of the pulley to prevent splashing and accidental injury, and to serve a cam function as will be described.

Figure 6:
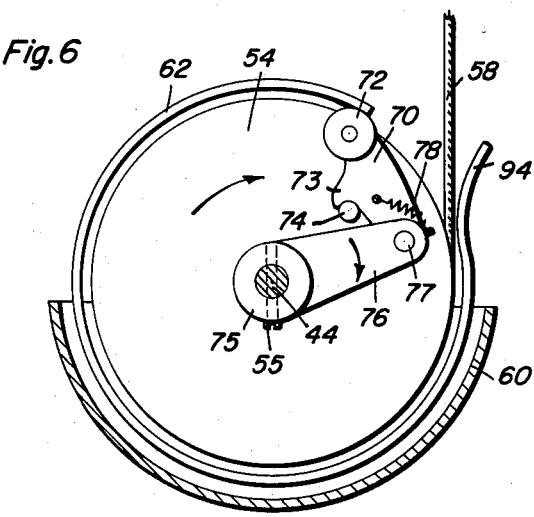
Figure 6 is a sectional view showing the hammer release mechanism in one position that is, as the cable is being wound on the drum.
Figure 2:
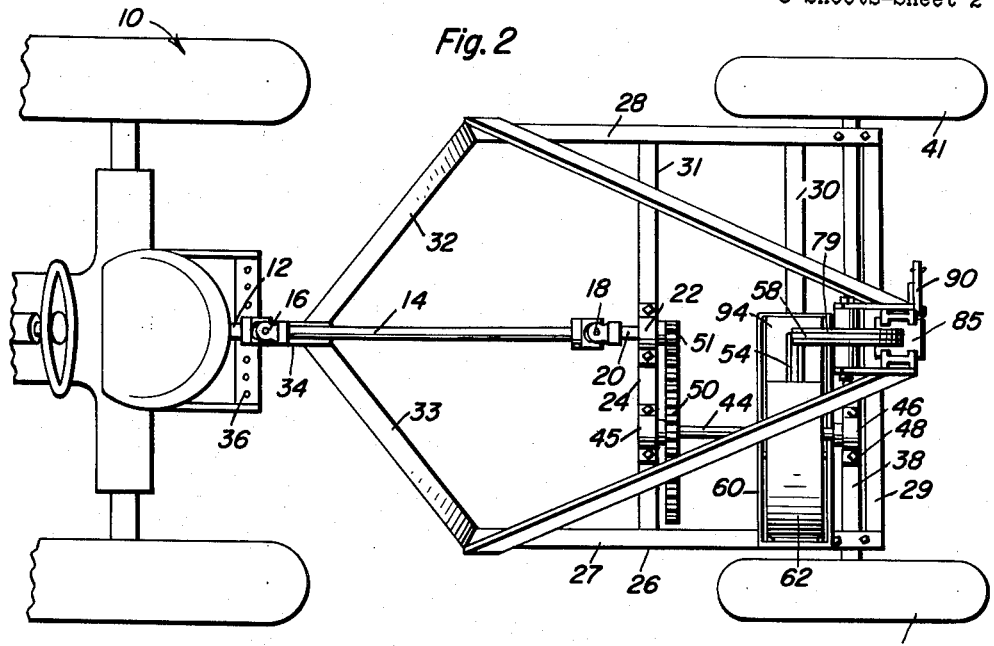
Figure 2 is a top view of the structure in Figure 1.

Pulley or winding drum 54 constitutes an important part of the invention. It is capable of rotating freely on shaft 44 but is drivingly connected to the shaft by means of two dogs 70 and 71. The dogs 70 and 71 are a part of a drive mechanism which is located in part on one side of the winding drum 54 and in part on the opposite side. The structures are identical and therefore one is shown in detail in Figures 6-8 inclusive. Dog 70 has a roller 72 at one end which is adapted to contact the inner surface of guard 62. This guard not only serves the secondary functions that were mentioned previously, but also serves the primary function of a cam. Dog 70 has a keeper 73 protruding from, it and the keeper is arranged to contact lug or pin 74 on one face of the pulley or drum 54. Collar 75 which is fixed to shaft 44 as by a pin 55 has an arm 76 protruding from it and a pin 77 in the arm by which dog 70 is mounted for pivotal movement. Spring 78 is attached to dog 70 and to arm 76 and constantly biases the dog 70 in a direction to force the roller 72 into contact with the surface of guard 62.

Figure 5:
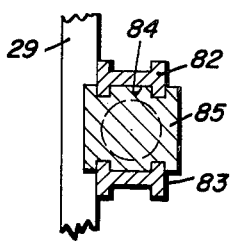
Figure 5 is an enlarged fragmentary sectional view showing the hammer construction and its connection with the pair of rails that form a track for the hammer.

Cable 58 extends over a sheave 79 that is mounted for free rotation on a shaft 80. The shaft is carried by a pair of brackets 81 on the upper end of rails 82 and 83. These rails are preferably, but not necessarily, constructed of a pair of I-beams (Fig. 5) and they form a track 84 within which hammer 85 is fitted. The hammer has four elongated grooves in the sides thereof by which to interfit with the confronting flanges of the I-beam rails 82 and 83 thereby interlocking the hammer so that it is constrained in its motion. Braces 88 extend from the top part of the rails to frame 26, firmly anchoring it and bracing it against shocks.

The post that is to be driven into the ground is placed between the rails so as to be in the path of travel of the hammer 85. Bars 87 that are pivoted to one front and one rear rail are opened to admit the post and then they are returned to their latch rests 89. After the post is driven in, the bars 87 are opened to allow the machine to be moved. The bars 87 help to keep the post centered between the rails, especially during the beginning of the driving of the post.

Upon rotation of the shaft 44, the winding drum 54 is moved in such direction as to wind cable 58 on its periphery. On one of the cable ends there is an attachment to the drum and the other end is attached to the hammer 85 while the intermediate part of the cable is entrained over sheave 79. With the position of parts shown in Figure 6, the dogs 70 and 71 will engage their lugs or pins 74 causing the dogs to rotate the winding drum. This lifts the hammer, pulling it past the rocker 90 which is mounted for pivotal movement on the lateral bracket 91 near the top of the rails. A ratchet can be used to hold the rocker 90 in such position as to support the hammer 85 in the raised position. The ratchet can be released by handle 92 which is connected to the ratchet by link 93.

Figure 7:
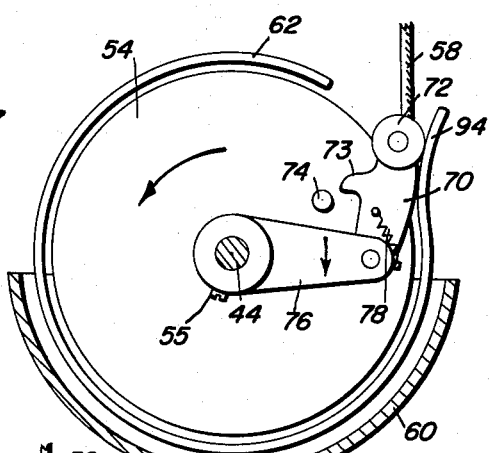
Figure 7 is a sectional view similar to that of Figure 6 but showing the lug of the drum being released enabling the drum to be rotated in the opposite direction due to the weight of the hammer.
Figure 8:
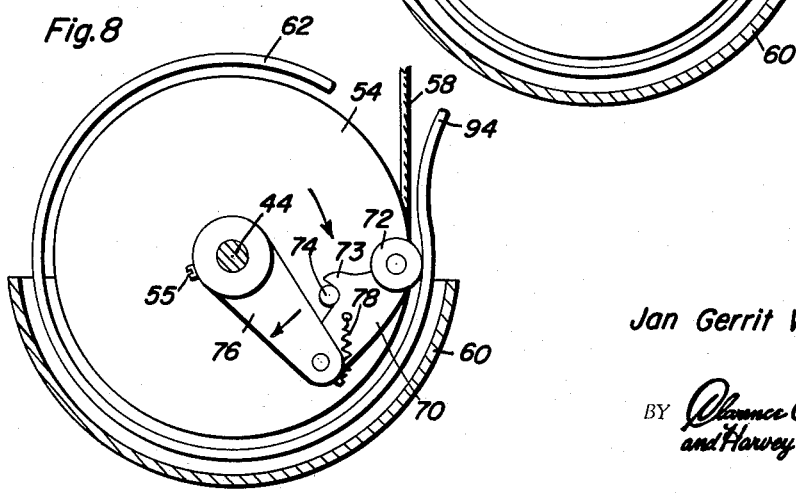
Figure 8 is a sectional view showing the drum as it is again engaged by the dog to commence another cycle of operation.
Figure 3:
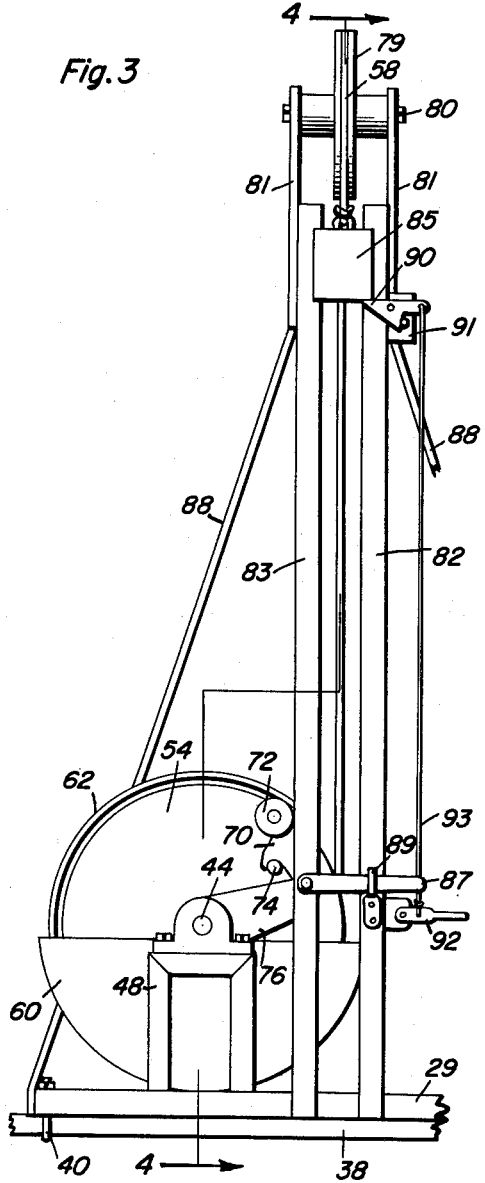
Figure 3 is a rear view showing a portion of the machine.
Figure 4:
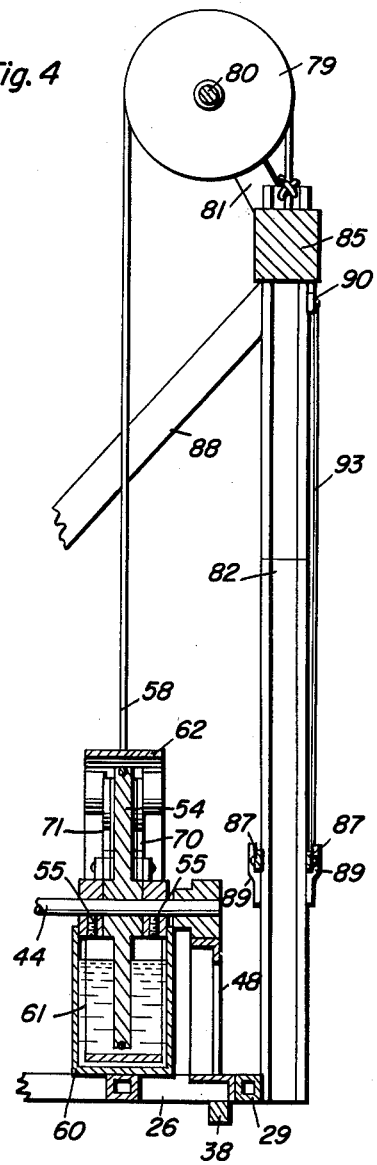
Figure 4 is a sectional view taken on the line 4—4 of Figure 3.

The rocker 90 may be used for retaining the hammer in its raised position when the machine is transported from one location to another, but when the machine is in use, the rocker is moved out of the path of travel of the hammer so that the latter is free to rise and fall. When during raising of the hammer the drum 54 is rotated from the position shown in Figure 8 to that shown in Figure 6, the dogs 70, 71 will eventually reach the space or opening in the cam 62 when the hammer is fully raised. At that time the dogs will be permitted to fly outwardly by the action of the springs 78, thus disengaging the keepers 73 from the lugs 74, and permitting the drum to rotate freely in the relatively opposite direction as shown in Figure 7, while the hammer falls to its lowered position by gravity. Thereupon, continued rotation of the shaft 44 will again cause the dogs 70, 71 to be drawn inwardly by the cam 62 so that the keepers 73 again engage the lugs 74 for the next cycle of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an actuating mechanism for pile driver hammers, the combination of a continuously rotatable drive shaft, a drum mounted on said shaft and rotatable independently thereof, a hammer raising and lowering cable secured at one end thereof to said drum and adapted to be unwound from the drum by the weight of a hammer attached to the cable, a crank arm secured to said shaft at one side of said drum, a driving dog having inner and outer ends and pivoted at its inner end to said crank arm, said dog being swingable radially inwardly and outwardly relative to said shaft, a laterally projecting lug provided at said one side of the drum, a keeper provided intermediate the ends of said dog and engaging said lug when the dog is swung inwardly to impart rotation to the drum by said shaft for winding said cable on the drum, a substantially annular cam track surrounding said drum and provided at a point along its circumference with an opening, and resilient means connected to said dog and urging the same outwardly against said cam track and to a projected position into said opening, engagement of said dog with the cam track sustaining said keeper in engagement with said lug during winding of said cable and projection of the dog by said resilient means into said opening disengaging said keeper from said lug during unwinding of the cable from the drum.

2. The device as defined in claim 1 together with a rotatable roller provided at the outer end of said dog and engageable with said cam track.

3. The device as defined in claim 1 wherein said cable extends outwardly through said opening in said cam track.

4. The device as defined in claim 1 together with an outwardly curved guiding lip provided on said cam track at one side of the opening therein for guiding the outer end of said dog into engagement with the cam track.

References Cited in the file of this patent

UNITED STATES PATENTS

| 504,762 | Vobach | Sept. 12, 1893 |
| 1,633,155 | Zabel | June 21, 1927 |
| 1,680,450 | Carlson | Aug. 14, 1928 |
| 2,476,390 | Simmonds | July 19, 1949 |
| 2,833,120 | Barrett et al. | May 6, 1958 |

FOREIGN PATENTS

| 710,689 | Great Britain | June 16, 1954 |